US012804042B2

(12) United States Patent
Russell et al.

(10) Patent No.: US 12,804,042 B2
(45) Date of Patent: Nov. 17, 2026

(54) METHOD AND SYSTEM ACCOUNTING FOR MEASUREMENT UNITS IN SIGNALING

(71) Applicant: BlackBerry Limited, Waterloo (CA)

(72) Inventors: Nicholas James Russell, Newbury (GB); Pierre Pierre Blais, Kanata (CA)

(73) Assignee: BlackBerry Limited, Waterloo (CA)

( * ) Notice: Subject to any disclaimer, the term of this patent is extended or adjusted under 35 U.S.C. 154(b) by 16 days.

(21) Appl. No.: 18/819,525

(22) Filed: Aug. 29, 2024

(65) Prior Publication Data

US 2025/0141963 A1 May 1, 2025

Related U.S. Application Data

(60) Provisional application No. 63/593,803, filed on Oct. 27, 2023.

(51) Int. Cl.

| | |
|---|---|
| ***G07C 5/00*** | (2006.01) |
| ***H04L 67/12*** | (2022.01) |
| *H04W 4/38* | (2018.01) |

(52) U.S. Cl.

CPC .............. *H04L 67/12* (2013.01); *G07C 5/008* (2013.01); *H04W 4/38* (2018.02)

(58) Field of Classification Search

CPC ........ H04L 67/12; G07C 5/008; H04W 24/02; H04W 4/38; H04W 4/40

See application file for complete search history.

(56) References Cited

U.S. PATENT DOCUMENTS

| | | | | |
|---|---|---|---|---|
| 6,960,756 | B1 * | 11/2005 | Penumadu | G01N 15/0227 250/222.2 |
| 7,788,306 | B2 * | 8/2010 | Dykes | G06Q 90/00 708/206 |
| 9,471,640 | B2 * | 10/2016 | Wolf | G06F 16/24568 |
| 12,052,330 | B2 * | 7/2024 | Khasis | H04L 41/16 |
| 12,408,011 | B2 * | 9/2025 | Vassilovski | H04W 4/38 |
| 2005/0234784 | A1 * | 10/2005 | McClellan | G06Q 10/087 705/28 |
| 2008/0300055 | A1 * | 12/2008 | Lutnick | G06F 3/011 463/39 |
| 2013/0151671 | A1 | 6/2013 | Alvarez Rodriguez | |
| 2013/0331961 | A1 * | 12/2013 | Mosley | G05B 19/4185 700/73 |
| 2016/0260325 | A1 * | 9/2016 | Modica | G08G 1/083 |
| 2017/0103587 | A1 * | 4/2017 | Oberschachtsiek | H04W 4/48 |
| 2019/0007513 | A1 * | 1/2019 | Flynn, IV | H04L 67/565 |

(Continued)

OTHER PUBLICATIONS

D. Wilms, D. Alvarez-Coello and A. Bekan, “An Evolving Ontology for Vehicle Signals,” 2021 IEEE 93rd Vehicular Technology Conference (VTC2021-Spring), Helsinki, Finland, Apr. 25-28, 2021, pp. 1-5, doi: 10.1109/VTC2021-Spring51267.2021.9448884. (Year: 2021).*

(Continued)

*Primary Examiner* — Jason D Cardone
(74) *Attorney, Agent, or Firm* — Moffat & Co

(57) ABSTRACT

A method at a computing device, the method including sending a request for information to a second entity; and receiving a response providing the information, the response further specifying the unit that the information is provided in. The measurement unit may be appended as a separate branch for a signal, a name for a signal, using a separator for the signal, or a combination thereof.

18 Claims, 8 Drawing Sheets

(56) References Cited

U.S. PATENT DOCUMENTS

| | | | | |
|---|---|---|---|---|
| 2020/0260255 | A1* | 8/2020 | Jamadagni | H04W 8/08 |
| 2021/0067613 | A1* | 3/2021 | Li | H04L 69/22 |
| 2021/0120098 | A1 | 4/2021 | Trichias et al. | |
| 2023/0206766 | A1* | 6/2023 | Jalkanen | G08G 1/0116<br>340/436 |
| 2023/0232199 | A1* | 7/2023 | Vassilovski | H04W 4/026<br>455/404.1 |
| 2025/0039047 | A1* | 1/2025 | Pignataro | H04L 41/0833 |

OTHER PUBLICATIONS

COVESA VSS documentation, as captured by Archive.org on May 19, 2023, downloaded from https://web.archive.org/web/20230519150343/https://covesa.github.io/vehicle_signal_specification.

COVESA VSS specification, release 4.0, May 2023.

European Patent Office (EPO): Extended European Search Report (EESR) for Application No. 24209065.2, dated: Feb. 28, 2025, 8 pages.

* cited by examiner

METHOD AND SYSTEM ACCOUNTING FOR MEASUREMENT UNITS IN SIGNALING

FIELD OF THE DISCLOSURE

The present disclosure relates to computing systems such as vehicle systems, and in particular relates to signaling within such computing systems.

BACKGROUND

Modern vehicles have many components and sensors. Such components and sensors may be referred to as data objects, and be queried to provide insights into the vehicle and the operation of the vehicle.

Different signals around a device, such as a vehicle, can indicate a value that may, but need not, change over time. Such signals can be categorized and identified using a hierarchical format.

One example of the hierarchical format is that provided by the COnnected VEhicle Systems Alliance (COVESA), which defines a set of signals for vehicles called the Vehicle Signal Specification (VSS), where such signals in a particular format are defined.

BRIEF DESCRIPTION OF THE DRAWINGS

The present disclosure will be better understood with reference to the drawings, in which.

DETAILED DESCRIPTION OF THE DRAWINGS

Figure 1:
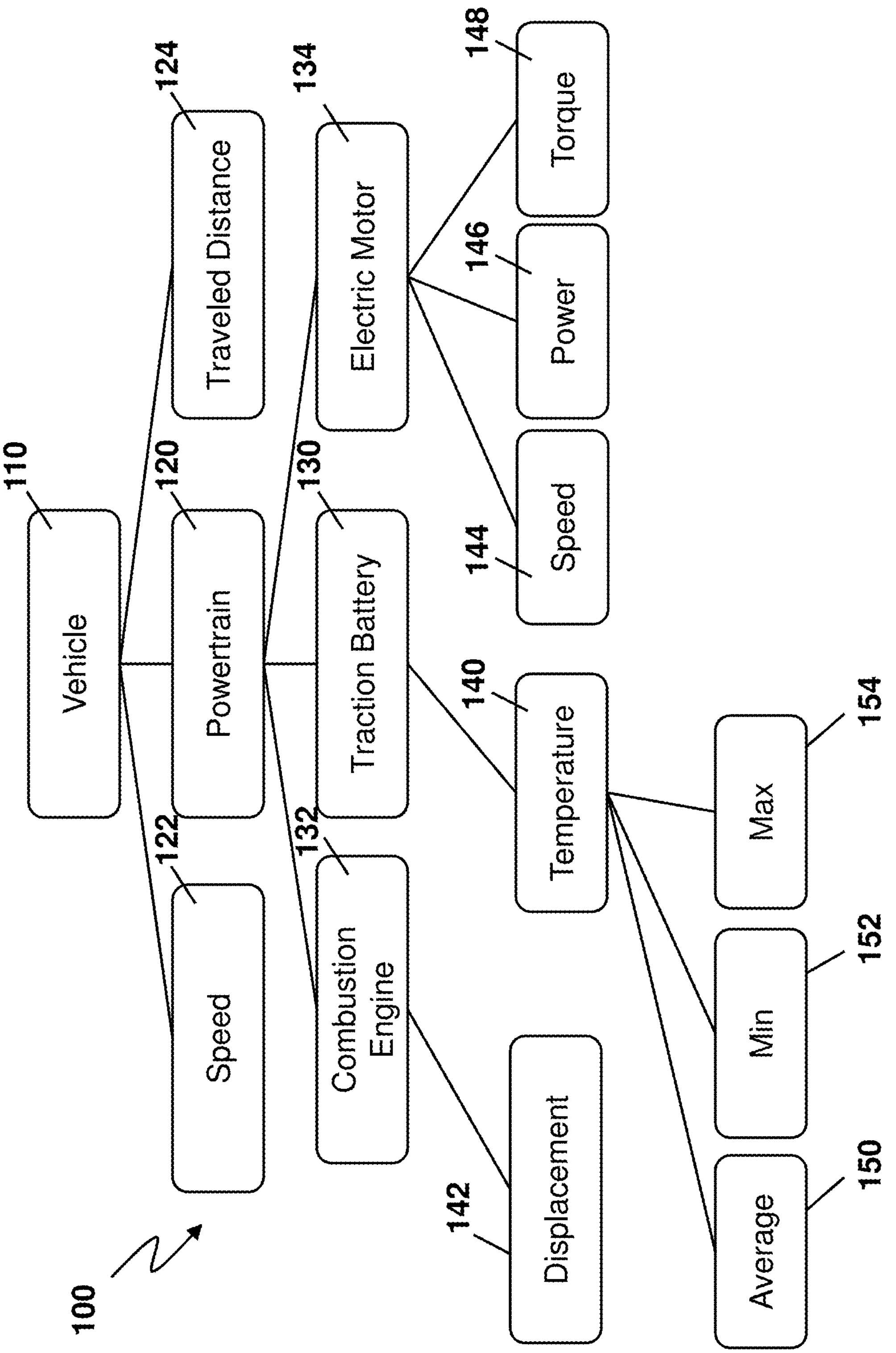
FIG. 1 PRIOR ART
FIG. 1 is a block diagram showing a tree structure for VSS.

The present disclosure provides a method at a computing device comprising: sending a request for data from a signal to a second entity; and receiving a response providing the data, the response further specifying a measurement unit for the signal.

The present disclosure further provides a computing device comprising: a processor; and a communication subsystem, wherein the computing device is configured to: send a request for data from a signal to a second entity; and receive a response providing the data, the response further specifying a measurement unit for the signal.

The present disclosure further provides a computer readable medium for storing instruction code which, when executed by a processor of a computing device cause the computing device to: send a request for data from a signal to a second entity; and receive a response providing the data, the response further specifying a measurement unit for the signal In a device such as a vehicle, information from one or more physical sensors may be processed by an application obtaining information from the device. For example, an insurance company may have a device to be plugged into an On-Board Diagnostics (OBD) port to monitor the driving habits of an insured driver. An application on such device may query the vehicle and obtain information from the vehicle. Other options are possible.

However, in order for the receiving entity of a signal to be able to understand and/or process the signal, the entity may need to know the unit of measurement that the value of the signal indicates. For example, a signal that indicates a speed of a vehicle could provide a value that represents miles per hour (MPH or mph), kilometers per hour (km/h), wheel revolutions per second (RPS), among other options.

COVESA VSS addresses this problem by specifying a specific unit of measurement that should be used with regard to VSS signals. For example, the Vehicle.Speed signal is defined to use kilometers per hour. A receiving entity conformant/compliant to VSS can then infer the unit of measurement in the received signal based on this specification.

However, COVESA specifies that implementors can make changes if they wish (through the use of "Overlays).

Further, not all audiences that use COVESA VSS prefer the same unit of measurement. For example, some parts of the world may favor miles per hour as a unit of measure for vehicle speed over kilometers per hour. This has resulted in some vehicle manufacturers or vehicle component manufacturers implementing different units of measurement according to their preference.

This different unit of measurement typically is not conveyed without an explicit secondary query to a receiving entity. Thus, the different unit of measurement may cause misinterpretation of the received value (e.g., a receiving entity may process a speed value always as kilometers per hour rather than miles per hour, as kilometers an hour is the unit specified according to COVESA VSS).

While this may be acceptable for applications that are written by the vehicle manufacturer, as this is known to them, for third party applications this may create uncertainty or may require the application designer to modify the application for different Original Equipment Manufacturers (OEM) or for different regions in order for the application to be portable.

Furthermore, the COVESA VSS solution enables only a single unit of measurement to be conveyed, leaving any conversion to the receiving entity.

VSS defines itself as a way to create a common understanding of vehicle signals in order to reach a common language independent of the protocol or serialization used.

The VSS naming convention is, for example, described in Table 1 below.

TABLE 1

| Example VSS naming conventions |
|---|
| Vehicle.Speed |
| Vehicle.TraveledDistance |
| Vehicle.Powertrain |
| Vehicle.Powertrain.CombustionEngine.Displacement |
| Vehicle.Powertrain.CombustionEngine.DieselParticulateFilter.InletTemperature |
| Vehicle.Cabin.Seat.Row1.DriverSide.HeatingCooling |
| Vehicle.Cabin.Seat.Row2.PassengerSide.HeatingCooling |
| Vehicle.Cabin.Seat.Row2.Middle.HeatingCooling |

As seen from Table 1 above, a dot notated name path is utilized in VSS. Such dot notation may further identify a component as a branch node (a set of data entries) and a data entry node/leaf/signal (a sensor, actuator, or attribute).

Utilizing the dot notated node path name, a tree structure can therefore be built for the various data objects within the vehicle.

However, various portions of the VSS catalog are currently rigid and define only one unit of measurement. For example, vehicle speed is defined in km/h. This is shown in the example VSS in Table 2 below:

TABLE 2

Example VSS

| Signal | Type | Data Type | Unit |
|---|---|---|---|
| Vehicle | branch | | |
| Vehicle.Speed | sensor | float | km/h |
| Vehicle.TraveledDistance | sensor | float | km |
| Vehicle.Powertrain | branch | | |
| Vehicle.Powertrain.CombustionEngine | branch | | |
| Vehicle.Powertrain.CombustionEngine.Displacement | attribute | uint16 | cm^3 |
| Vehicle.Powertrain.ElectricMotor | branch | | |
| Vehicle.Powertrain.ElectricMotor.MaxPower | attribute | uint16 | kW |
| Vehicle.Powertrain.ElectricMotor.Speed | sensor | int32 | rpm |
| Vehicle.Powertrain.ElectricMotor.Power | sensor | int32 | kW |
| Vehicle.Powertrain.ElectricMotor.Torque | sensor | int32 | Nm |
| Vehicle.Powertrain.TractionBattery | branch | | |
| Vehicle.Powertrain.TractionBattery.Temperature | branch | | |
| Vehicle.Powertrain.TractionBattery.Temperature.Average | sensor | float | celsius |
| Vehicle.Powertrain.TractionBattery.Temperature.Min | sensor | float | celsius |
| Vehicle.Powertrain.TractionBattery.Temperature.Max | sensor | float | celsius |

Table 2 provides a small subset of the VSS catalog. In Table 2, a sensor is a one-way signal originating from a vehicle. An actuator is a two directional signal, and can set or get values. A branch is a node in a tree structure. An attribute is typically a fixed value but may also be a one-way signal originating from a vehicle with an expectation that the value will change infrequently or be set only once per ignition cycle.

For example, reference is now made to FIG. 1, which shows an example tree structure for a portion of Table 2 above.

In the embodiment of FIG. 1, an object tree 100 has the vehicle 110 as the root. Below this root, an example in the tree could be a powertrain 120, which could be a branch.

Further examples include a speed 122 and traveled distance 124, which are both sensors.

Powertrain 120 may have a battery, shown as Traction Battery 130. It may further have a combustion engine 132 and/or an electric motor 134.

In the example of FIG. 1, Traction Battery 130 includes a temperature branch 140. The battery temperature may have various sensors, attributes, actuators and branches. Sensors may include an average temperature 150, a minimum temperature 152, and a maximum temperature 154. Other sensors and actuators from the VSS catalog are not illustrated for simplicity.

Similarly, electric motor 134 may have various sensors, attributes, actuators and branches associated with it. In the simplified example of FIG. 1, electric motor speed 144, power 146 and torque 148 sensors are shown.

As shown in Table 2, each of the sensors and attributes provides data in a specified unit. However, as further provided above, not all manufacturers use the designated VSS units, and may choose to use a different unit.

Therefore, in accordance with embodiments of the present disclosure, in order to allow for different, possibly multiple units of measurement to be conveyed in signals indicating values from sensors, VSS may be defined to extend the identification of signals to include an indication or identification of the measurement unit associated with the value of the signal.

This may be done in various ways. In one case, the units may be appended as a separate entity/node under a branch. In one case, the naming convention of the signal may be amended to include a unit. In one case, the signal may use a separator with a unit selected from an enumerated list. Each is described below.

Creating Branches and Appending Units

In one embodiment, a sending entity may append an identifier of a unit of measurement. For example, a vehicle speed may have a speed unit appended to the end of a signal for vehicle speed (e.g., Vehicle.Speed.MPH, Vehicle.Speed.KMH). Other units could be similarly appended.

For example, reference is made to Table 3, which is the VSS of Table 2, but with appended units.

TABLE 3

Example VSS with units appended

| Signal | Type | Data Type | Unit |
|---|---|---|---|
| Vehicle | branch | | |
| Vehicle.Speed | branch | | |
| Vehicle.Speed.MPH | sensor | float | MPH |
| Vehicle.Speed.KMH | sensor | float | km/h |
| Vehicle.TraveledDistance | branch | | |
| Vehicle.TraveledDistance.miles | sensor | float | miles |
| Vehicle.TraveledDistance.km | sensor | float | km |
| Vehicle.Powertrain | branch | | |
| Vehicle.Powertrain.CombustionEngine | branch | | |
| Vehicle.Powertrain.CombustionEngine.Displacement | branch | | |
| Vehicle.Powertrain.CombustionEngine.Displacement.cm3 | attribute | uint16 | cm^3 |
| Vehicle.Powertrain.CombustionEngine.Displacement.in3 | attribute | uint16 | inches^3 |
| Vehicle.Powertrain.ElectricMotor | branch | | |
| Vehicle.Powertrain.ElectricMotor.MaxPower | branch | | |
| Vehicle.Powertrain.ElectricMotor.MaxPower.hp | attribute | uint16 | horsepower |
| Vehicle.Powertrain.ElectricMotor.kWMaxPower.kW | attribute | uint16 | kW |
| Vehicle.Powertrain.ElectricMotor.Speed | branch | | |
| Vehicle.Powertrain.ElectricMotor.Speed.MPH | sensor | int32 | MPH |
| Vehicle.Powertrain.ElectricMotor.Speed.KMH | sensor | int32 | km/h |
| Vehicle.Powertrain.ElectricMotor.Speed.RPM | sensor | int32 | rpm |
| Vehicle.Powertrain.ElectricMotor.Power | branch | | |
| Vehicle.Powertrain.ElectricMotor.Power.hp | sensor | int32 | horsepower |
| Vehicle.Powertrain.ElectricMotor.Power.kW | sensor | int32 | kW |
| Vehicle.Powertrain.ElectricMotor.Torque | branch | | |
| Vehicle.Powertrain.ElectricMotor.Torque.lbft | sensor | int32 | lb · ft |
| Vehicle.Powertrain.ElectricMotor.Torque.Nm | sensor | int32 | Nm |
| Vehicle.Powertrain.TractionBattery | branch | | |
| Vehicle.Powertrain.TractionBattery.Temperature | branch | | |
| Vehicle.Powertrain.TractionBattery.Temperature.Average | branch | | |
| Vehicle.Powertrain.TractionBattery.Temperature.Average.oC | sensor | float | celsius |
| Vehicle.Powertrain.TractionBattery.Temperature.Average.oF | sensor | float | fahrenheit |
| Vehicle.Powertrain.TractionBattery.Temperature.Min | branch | | |
| Vehicle.Powertrain.TractionBattery.Temperature.Min.oC | sensor | float | celsius |
| Vehicle.Powertrain.TractionBattery.Temperature.Min.oF | sensor | float | fahrenheit |
| Vehicle.Powertrain.TractionBattery.Temperature.Max | branch | | |
| Vehicle.Powertrain.TractionBattery.Temperature.Max.oC | sensor | float | celsius |
| Vehicle.Powertrain.TractionBattery.Temperature.Max.oF | sensor | float | fahrenheit |

Thus, as provided in Table 3, the previous sensors or attributes can be turned into or interpreted as branches, and the sensors or attributes or actuators now have a unit associated therewith. For example, Vehicle.Speed is now a branch and Vehicle.Speed.MPH or a Vehicle.Speed.KMH indicate the unit that the measurement is to be provided in. Similar changes are shown in Table 3 and include temperatures, power, torque, among others. The present disclosure is not limited to any particular measurement unit and the principles of Table 3 could be expanded to other measurement units.

Further, the principles of Table 3 could be expanded to include other aspects of the signal, such as the data type being provided. For example, while the data type is specified in the third column of Table 3, such data type may be capable of being provided as an enumerated value. For example, Vehicle.Speed and Vehicle.Speed.MPH are returned as a float. However, if an application wants a particular data type, in some cases this may be specified. For example, the application may be satisfied with an integer for the speed and thus may request and receive a signal Vehicle.Speed.INT32 or Vehicle.Speed.MPH.INT32. In some cases, the integer may be signed or unsigned. In some cases, the application may want a string returned and the signal may be Vehicle.Speed.String or Vehicle.Speed.MPH.String. Other options are possible to expand the embodiment of Table 3.

Thus, the embodiment of Table 3 could further be enhanced or modified to include conveying other aspects related to the signal value, including the type, such as a branch, attribute, sensor or actuator; a data type such as an unsigned integer, signed integer, floating point number, string; or a minimum value, maximum value or default value, among other options. This would involve adding these aspects after a dot to the name of the signal.

Figure 2:
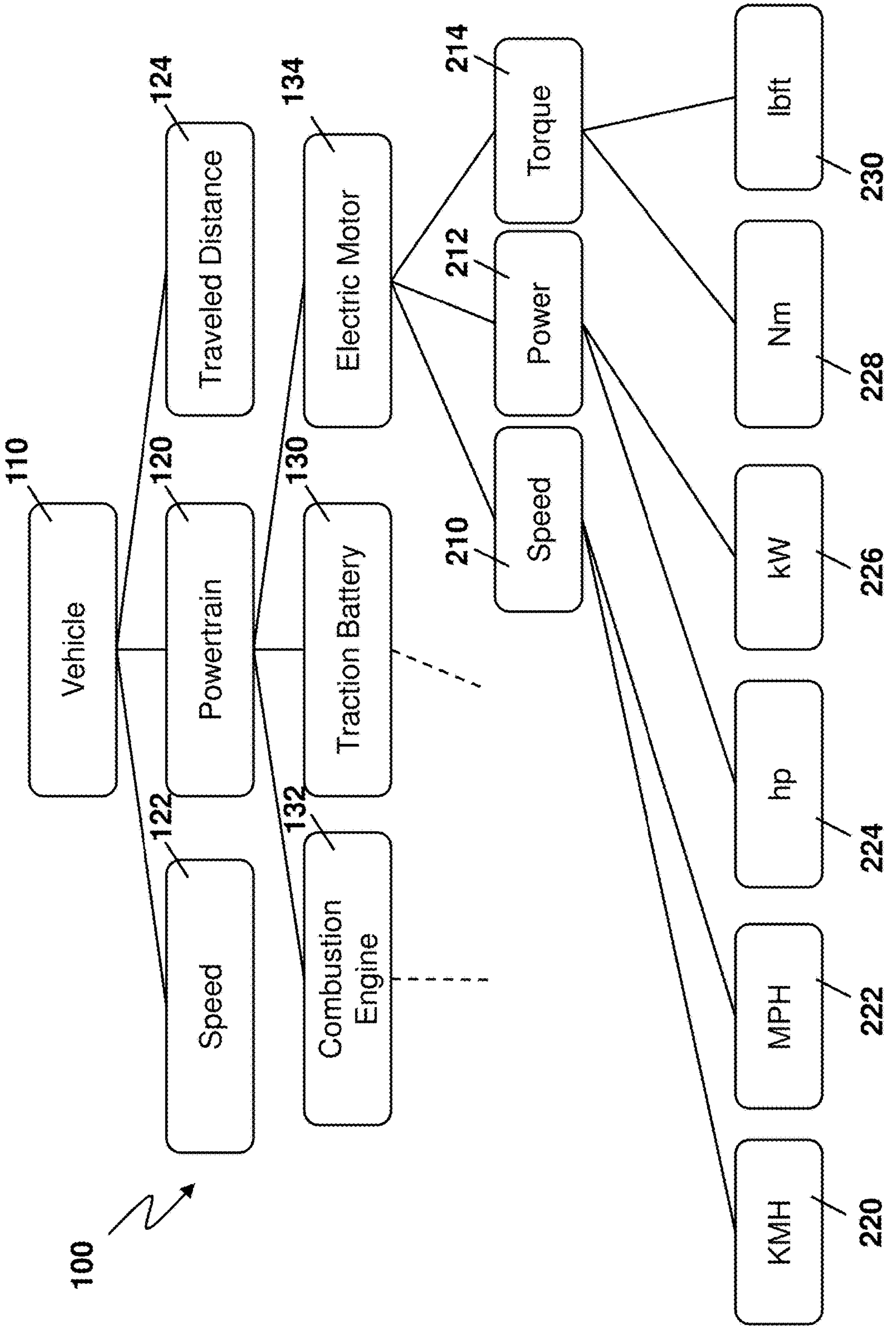
FIG. 2 is a block diagram showing a revised tree structure where branches are created, and signals are for a particular unit.

A portion of the expansion of Table 3 is for example shown in FIG. 2. The embodiment of FIG. 2 shows a portion of the tree from FIG. 1. However, in the example of FIG. 2, speed 210 is now a branch. Similarly, power 212 and torque 214 are now branches.

Under the speed branch 210, a first sensor value is in kilometers per hour is shown with block 220. A second sensor value is shown in MPH, as shown in block 222.

Under the power branch 212, a first block 224 is shown as horsepower and a second block 226 is shown as kW.

Under the torque branch 214, a first block 228 is shown as Newton meters and a second block 230 is shown as pound feet.

Further, the naming convention for the signal may be specified in a standard way. For example, an indication/identification of the measurement unit associated with the value of the signal may include characters in alphanumeric form, of which may be included as a replacement for another character e.g., "o" instead of "°" for degrees.

Therefore, based on Table 3 and FIG. 2, a signal may specify, using a dot notation, a unit for the signal in some cases, and/or other information such as the data type, the type of signal, among other options, in some cases.

Creating Newly Named Signals

In a further embodiment, the unit of measure could also be included in the name of the signal without altering the hierarchy. For example, in one case new signals could be defined that include the unit of measurement, such as Vehicle.SpeedMPH or Vehicle.SpeedKMH. In another case, tire pressure could be designated with the signal Vehicle. Wheels. Front. Right. PressureBar or with Vehicle. Wheels. Front. Right. PressurePSI. Other exam pies are possible.

For example, a portion of the VSS schema is shown in Table 4 below.

TABLE 4

Example VSS with units in signal name

| Signal | Type | Data Type | Unit |
|---|---|---|---|
| Vehicle | branch | | |
| Vehicle.SpeedMPH | sensor | float | MPH |
| Vehicle.SpeedKMH | sensor | float | km/h |
| Vehicle.TraveledDistanceMiles | sensor | float | miles |
| Vehicle.TraveledDistancekm | sensor | float | km |
| Vehicle.Powertrain | branch | | |
| Vehicle.Powertrain.CombustionEngine | branch | | |
| Vehicle.Powertrain.CombustionEngine.Displacementcm3 | attribute | uint16 | cm^3 |
| Vehicle.Powertrain.CombustionEngine.Displacementin3 | attribute | uint16 | inches^3 |
| Vehicle.Powertrain.ElectricMotor | branch | | |
| Vehicle.Powertrain.ElectricMotor.MaxPowerHP | attribute | uint16 | horsepower |
| Vehicle.Powertrain.ElectricMotor.kWMaxPowerkW | attribute | uint16 | kW |
| Vehicle.Powertrain.ElectricMotor.SpeedMPH | sensor | int32 | MPH |
| Vehicle.Powertrain.ElectricMotor.SpeedKMH | sensor | int32 | km/h |
| Vehicle.Powertrain.ElectricMotor.SpeedRPM | sensor | int32 | rpm |
| Vehicle.Powertrain.ElectricMotor.PowerHp | sensor | int32 | horsepower |
| Vehicle.Powertrain.ElectricMotor.PowerkW | sensor | int32 | kW |
| Vehicle.Powertrain.ElectricMotor.Torquelbft | sensor | int32 | lb · ft |
| Vehicle.Powertrain.ElectricMotor.TorqueNm | sensor | int32 | Nm |
| Vehicle.Powertrain.TractionBattery | branch | | |
| Vehicle.Powertrain.TractionBattery.Temperature | branch | | |
| Vehicle.Powertrain.TractionBattery.Temperature.AverageoC | sensor | float | celsius |
| Vehicle.Powertrain.TractionBattery.Temperature.AverageoF | sensor | float | fahrenheit |
| Vehicle.Powertrain.TractionBattery.Temperature.Min.oC | sensor | float | celsius |
| Vehicle.Powertrain.TractionBattery.Temperature.MinoF | sensor | float | fahrenheit |
| Vehicle.Powertrain.TractionBattery.Temperature.MaxoC | sensor | float | celsius |
| Vehicle.Powertrain.TractionBattery.Temperature.MaxoF | sensor | float | fahrenheit |

Thus, as seen in Table 4, rather than creating new branches and then having a further dot with the unit of measurement, as for example illustrated in Table 3, new signals are created in which the signal name includes the unit of measurement.

Figure 3:
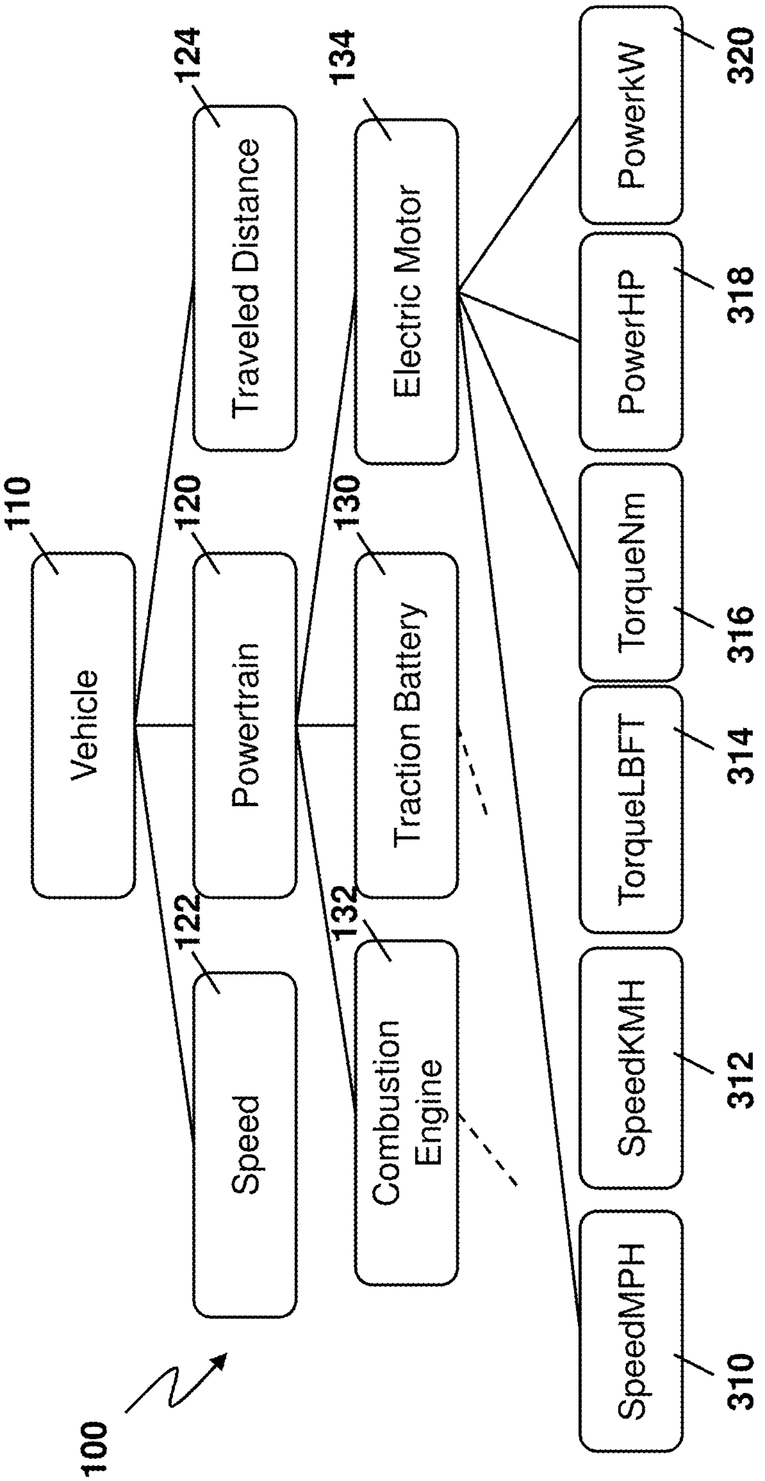
FIG. 3 is a block diagram showing a revised tree where signal names are modified to include units.

This is further illustrated in FIG. 3. In the example of FIG. 3, which shows a portion of a VSS catalog in a tree format, similar reference numerals are used as those in FIG. 1.

However, in the example of FIG. 3, electric motor 134 may have new signals which include a speed in mph as shown at block 310, a speed in km/h, as shown at block 312, a torque in pound feet, as shown at block 314, a torque in Newton meters, as shown at block 316, a power in horsepower, as shown at block 318, and a power in kW, as shown at block 320.

As with the embodiment of FIG. 2, the embodiment of FIG. 3 could further be enhanced or modified to include conveying other aspects related to the signal value, including the type, such as a branch, attribute, sensor or actuator; a data type such as an unsigned integer, signed integer, floating point number, string; or a minimum value, maximum value, or default value, among other options. This would involve changing the name of the signal to convey such information, where a certain signal such as the vehicle speed may then be delineated to include such additional information. For example, Vehicle.SpeedKMH and Vehicle.SpeedMPH are returned as a float. However, if an application wants a particular data type, in some cases this may be specified. For example, the application may be satisfied with an integer for the speed and thus may request and receive a signal Vehicle.SpeedINT32 or Vehicle.SpeedMPHINT32. In some cases, the integer may be signed or unsigned. In some cases, the application may want a string returned and the signal may be Vehicle.SpeedString or Vehicle.SpeedMPHString. Other options are possible to expand the embodiment of Table 4.

Use of Separators to Convey Information

In still a further embodiment, the VSS catalog could be modified to allow other separator characters ("separators") appended by enumerated values or pieces of information to form part of a signal. In the examples below, such separator is denoted as "#". However, this separator is not limiting, and other characters or groups of characters could equally be used as a separator.

In this case, the signal could be enhanced by adding a separator and then a piece of information, such as the units for the data. Thus, the current signal Vehicle.Speed could be modified to Vehicle.Speed #MPH to indicate that the speed units are miles per hour. In another case, the signal could be modified to Vehicle.Speed #KMH to indicate that the speed units are in kilometers per hour.

The VSS Catalog could then be modified to enumerate the units that are acceptable in some cases. For example, reference is made to Table 5.

TABLE 5

Example VSS with units in separators

| Signal | Type | Data Type | Unit |
|---|---|---|---|
| Vehicle | branch | | |
| Vehicle.Speed | sensor | Float | [#MPH, #KMH] |
| Vehicle.TraveledDistance | sensor | Float | [#miles, #km] |
| Vehicle.Powertrain | branch | | |
| Vehicle.Powertrain.CombustionEngine | branch | | |
| Vehicle.Powertrain.CombustionEngine.Displacement | attribute | uint16 | [#cm^3, #inches^3] |
| Vehicle.Powertrain.ElectricMotor | branch | | |
| Vehicle.Powertrain.ElectricMotor.MaxPower | attribute | uint16 | [#hp, #kW] |
| Vehicle.Powertrain.ElectricMotor.Speed | sensor | int32 | [#MPH, #KMH, #rpm] |
| Vehicle.Powertrain.ElectricMotor.Power | sensor | int32 | [#hp, #kW] |
| Vehicle.Powertrain.ElectricMotor.Torque | sensor | int32 | [#lbft, #Nm] |
| Vehicle.Powertrain.TractionBattery | branch | | |
| Vehicle.Powertrain.TractionBattery.Temperature | branch | | |
| Vehicle.Powertrain.TractionBattery.Temperature.Average | sensor | Float | [#oC, #oF] |
| Vehicle.Powertrain.TractionBattery.Temperature.Min | sensor | Float | [#oC, #oF] |
| Vehicle.Powertrain.TractionBattery.Temperature.Max | sensor | Float | [#oC, #oF] |

From Table 5, the units for each signal are enumerated in a list shown between square brackets. In some cases, the first element of the list could be the default value that is used, and therefore if a separator is not specified in a signal request or a signal response, then the sending or receiving entity could assume that the unit for the signal is the first value in the enumerated list.

In other cases, the separator may be a ".". For example, from the embodiment of Table 3 and FIG. 2, a new branch was created and the unit placed as an attribute or sensor value under that branch. In the present embodiment, rather than a new branch, a unit (or other data) could be specified with a dot notation, such as Vehicle.Speed.MPH, where the receiving entity would interpret the ".MPH" as a separator and unit combination. Thus, the suffixed units not to be interpreted as nodes, but instead be recognized as units, leaving the node definition to the signal itself and the suffix being interpreted.

In one case, a server responding to the receiving node's request for, for example, Vehicle.Speed.MPH, may check if the suffix corresponds to one of the supported units. In this case, the suffix being mph, since this is a supported unit, the server may recognize the two entities: Vehicle.Speed and mph. The server would use the Vehicle.Speed definition to return a value for the signal. If Vehicle.Speed in this implementation is defined in mph, then no conversion would be necessary and any value would be returned as it is. If the Vehicle.Speed signal was defined to be in km/h, the service may respond to a query for Vehicle.Speed.KMH by doing the conversion from mph to km/h, saving the calling application from having to do this conversion, as described below.

In other cases, a server could receive the node's request for, for example, Vehicle.Speed #MPH, and respond to the signal with a speed in miles per hour or return an error.

Other options are possible.

This approach would further allow a calling application using Vehicle.Speed instead of Vehicle.Speed.KMH or Vehicle.Speed.MPH to receive a value that uses the unit defined for Vehicle.Speed and would therefore be backwards compatible.

Further, in some cases, the enumerated list may not be exhaustive. Thus, if an OEM/manufacturer wishes to use a different unit, in some embodiments they could use the different unit and specify it with a separator. The receiving entity would then be obligated to interpret the separator and determine whether it can handle such units.

Table 5 shows the units with separators. In other cases, other values could also be enumerated and added to the signal with separators. Thus, a data type could in some cases form part of an enumerated list and the specific data type could be added after the signal name to indicate the type of data being transmitted or received. Thus, for example, a signal such as Vehicle.Speed #int32 could indicate that the speed in the signal is a 32-bit signed integer. As with the embodiments of FIGS. 2 and 3, various information such as the units, data types, signal types, minimum values, maximum values, default values or other information could be provided with the separator.

In some cases, more than one separator could be added with the signal name. Thus, for example, the Vehicle.Speed could have two separators (or more) after it. In one example the signal may be Vehicle.Speed #KMH #int32, indicating that the speed is in kilometers per hour and the value is a 32-bit signed integer. Further, while this example shows two values using the same separator, in some cases different separators could be used, one to indicate units and a different one to indicate other data such as a data type. For example, this could be Vehicle.Speed #KMH$int32. Other examples are possible.

Figure 4:
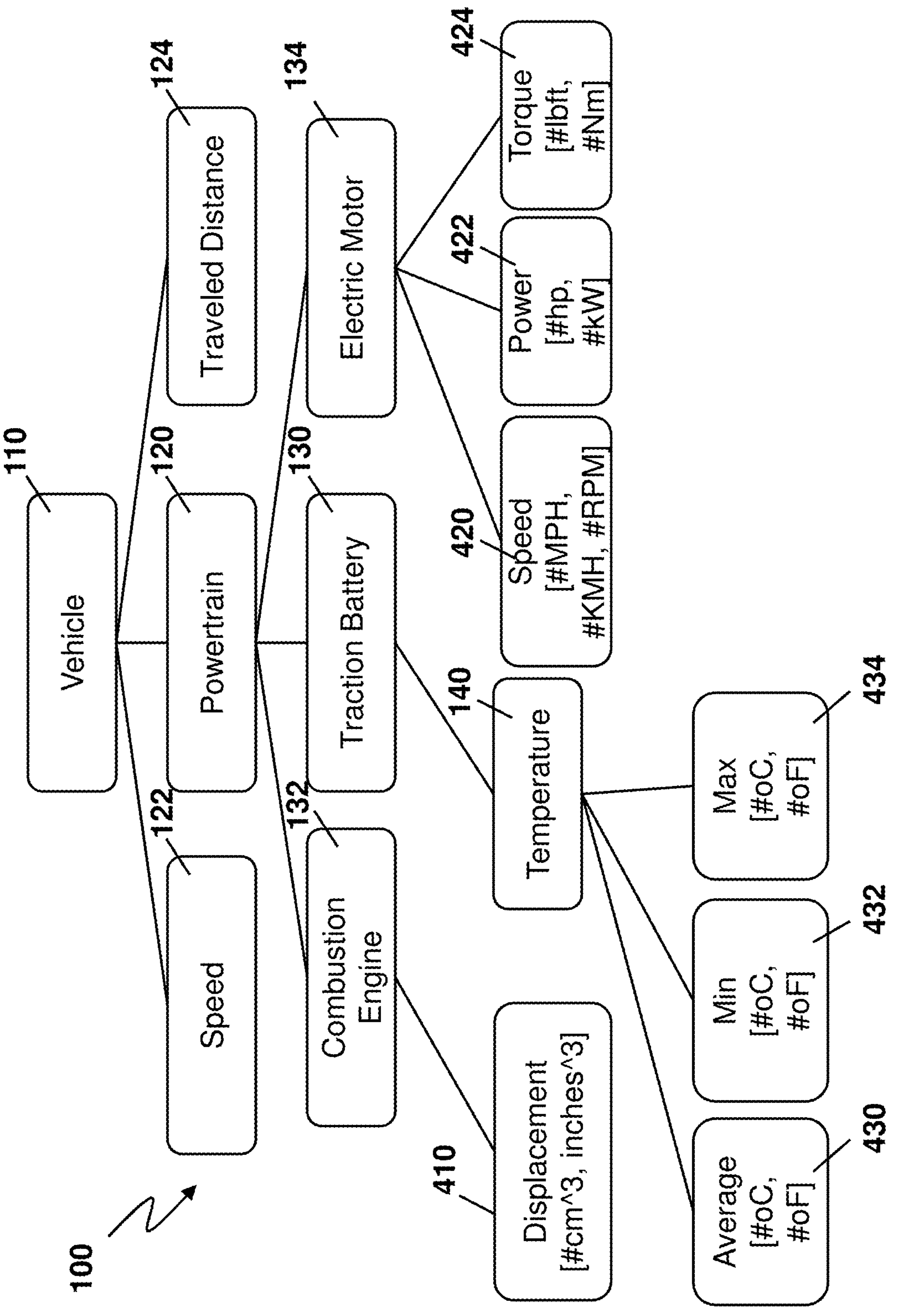
FIG. 4 is a block diagram showing a revised tree where units can be included after a signal name using a separator.

The use of separators with units is, for example, shown in FIG. 4, which illustrates a portion of a tree similar to the tree of FIG. 1. Like numerals from FIG. 1 are used in the example of FIG. 4.

As seen in FIG. 4, combustion engine 132 may include a displacement signal 410 which includes an enumerated list of units, including cubic centimeters and cubic inches.

Electric motor 134 includes a speed signal 420 which includes an enumerated list of units, including mph, km/h, and revolutions per minute (RPM).

Power signal 422 includes an enumerated list of units, including horsepower and kW.

Torque signal 424 includes an enumerated list of units including pound feet and Newton meters.

Further, a temperature branch 140 includes an average temperature signal 430, which includes enumerated list of temperature units in degrees Celsius and degrees Fahrenheit. Similarly, the minimum temperature signal 432 has an enumerated list of units including degrees Celsius and degrees Fahrenheit. A maximum temperature signal 434 further includes an enumerated list of units including degrees Celsius and degrees Fahrenheit.

Thus, based on the embodiment of Table 5 and FIG. 4, the VSS catalog can be modified by adding an enumerated list of units (or other information), which can be specified as part of the signal using separators. The use of separators allows the signal to be backward compatible, since the absence of units with a separator may indicate that the signal is using the units of the first element in the enumerated list.

Usage

Various examples are provided below to indicate how the specification of data (such as the type of unit for the data) in the signal call could be used.

While the embodiments of the present disclosure are provided with the example of a vehicle computing device, the present disclosure is not meant to be limited to vehicle computing systems. Other computing systems, such as vehicle fuelling/charging devices, Internet of Things (IoT) systems/devices, medical devices, among others, could equally use the principles provided in the present disclosure.

In particular, according to the embodiments of Tables 3-5 and FIGS. 2-4, the units (or other data regarding a signal) could be provided as part of the signal name, either as a separate branch, by renaming the signal, or using the data after a separator.

A requesting entity can then request a value of a signal that is of a particular measurement unit. Furthermore, if the entity determines that the second entity does not support a particular measurement unit (e.g., determined by the receiving of an error indication in response to a request, which may contain an indication of one or more measurement units), then the requesting entity can attempt to request values of the same signal of different measurement units. In this case, the requesting entity, upon receiving a value of a signal may then also perform another action (e.g., convert from one measurement unit to another).

A response-receiving entity can then determine, potentially with a much greater accuracy, the measurement unit used by the value indicated in such signals and may then also be able to determine further processing/actions (e.g., convert from one measurement unit to another).

Figure 5:
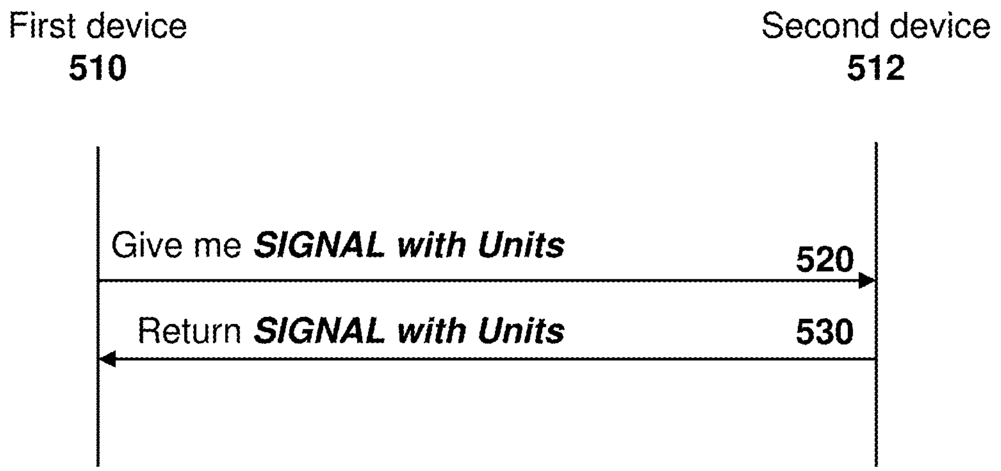
FIG. 5 is a dataflow diagram for providing signal information with units.

Reference is now made to FIG. 5. In the embodiment of FIG. 5, a first device 510 may communicate with a second device 512. For example, first device 510 may be an application on a computing device communicating with second device 512, which may be a vehicle. For example, first device 510 may be a computing device used for insurance purposes to monitor driving behaviour. However, other options are possible.

Further, first device 510 and second device 512 may be virtual devices (e.g. software or applications) running on the same computing device in some cases. Other options are possible.

In the embodiment of FIG. 5, a first device 510 may make a request 520 from second device 512, in which the request 520 asks for a signal with units. The request 520 may use the format of FIG. 2 and Table 3 in some cases. The request 520 may use the format of FIG. 3 and Table 4 in some cases. The request 520 may use the format of FIG. 4 and Table 5 in some cases. In some cases, the request may use a combination of the above embodiments. Other options are possible.

On receiving request 520, second device 512 may determine that it can provide such signal with units, and therefore provides a response 530 back to first device 510.

In this way, first device 510 can be sure of the units for the signal, thereby removing ambiguity in the communications between first device 510 and second device 512.

As will be appreciated by those skilled in the art, rather than, or in addition to, making request 520 with units, the request could include data types, types of information, or other data that is associated with a particular signal to remove ambiguity. Thus, the present disclosure is not limited to a request for a signal or the return of a message where the units are specified.

Figure 6:
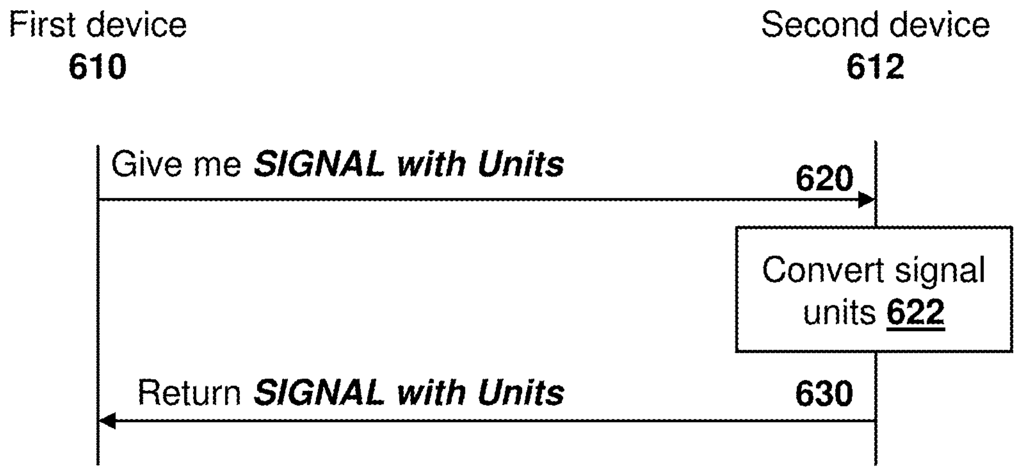
FIG. 6 is a dataflow diagram for providing signal information with units using unit conversion at a responding device.

However, in some cases, a device receiving a request may not have the data with the units requested. In this case, one option is for the second device to perform a conversion of units to the requested units. Reference is now made to FIG. 6.

In the embodiment of FIG. 6, a first device 610 communicates with a second device 612. First device 610 and second device 612 may be the same as first device 510 and a second device 512 from the embodiment of FIG. 5 in some cases.

First device 610 may send a request 620 to second device 612, where the request 620 asks for a signal with the units specified. The request 620 may use the format of FIG. 2 and Table 3 in some cases. The request 620 may use the format of FIG. 3 and Table 4 in some cases. The request 620 may use the format of FIG. 4 and Table 5 in some cases. In some cases, the request may use a combination of the above embodiments. Other options are possible.

As indicated, second device 612 may not have the signal with the requested units. Second device may perform a conversion of units to the requested units, shown at block 622.

Once the signal is in the requested units, second device 612 may provide a response 630 to first device 610, providing the signal with the requested units.

As with the embodiment of FIG. 5, the embodiment of FIG. 6 may provide other information where such information is specified in the request. Specifically, rather than, or in addition to, requesting a signal with units, the request could include data types, types of information, or other data that is associated with a particular message to remove ambiguity. Thus, the present disclosure is not limited to a request for a signal or the return of a signal where the units are specified.

Figure 7:
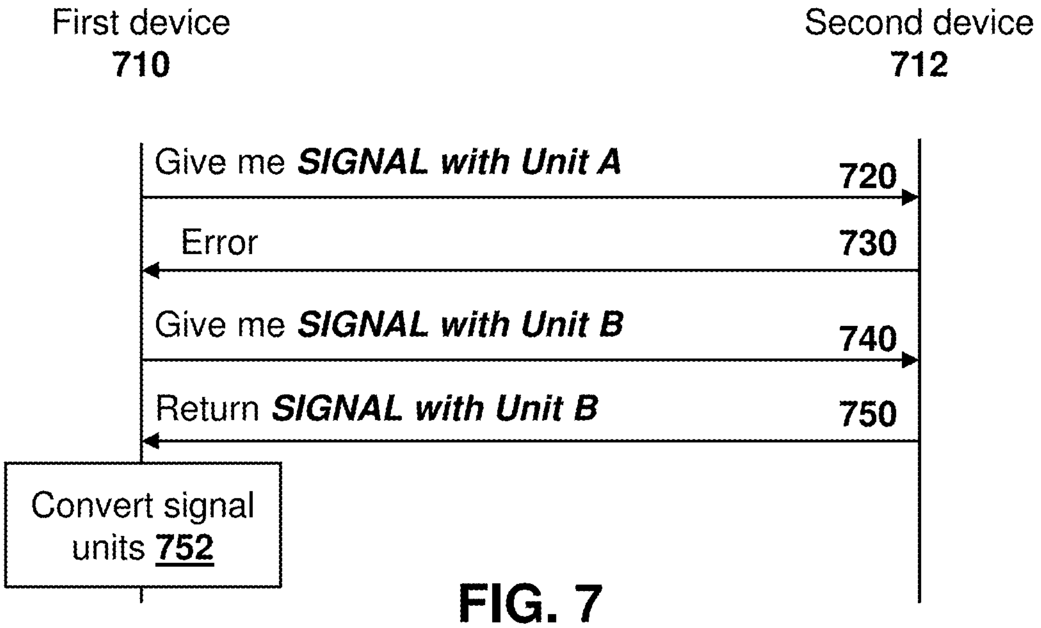
FIG. 7 is a dataflow diagram for providing signal information with units using unit conversion at a receiving device.

In still further cases, the second device may be unable to provide the signal with the requested units. In this case, an application on the first device may be robust enough to handle such situation. Reference is now made to FIG. 7.

In the embodiment of FIG. 7, a first device 710 communicates with a second device 712. First device 710 and second device 712 may be the same as first device 510 and a second device 512 from the embodiment of FIG. 5 in some cases.

First device 710 may send a request 720 to second device 712, where the request 720 asks for a signal with the units specified. In the embodiment of FIG. 7, this is shown as "Unit A" in the request 720. The request 720 may use the format of FIG. 2 and Table 3 in some cases. The request 720 may use the format of FIG. 3 and Table 4 in some cases. The request 720 may use the format of FIG. 4 and Table 5 in some cases. In some cases, the request may use a combination of the above embodiments. Other options are possible.

In the example FIG. 7, second device 712 is unable to provide the signal with the requested units and therefore returns an error indication 730.

In some cases, error indication 730 merely indicates that the second device is unable to provide the requested information.

In some cases, error indication 730 may include details or workarounds. For example, the error indication 730 may indicate that the requested units are unavailable, but that the information could be provided with other measurement units.

Other options are possible.

First device 710 receives error indication 730 and formulates a new request 740 in which the signal is asked for with different units, shown as “Unit B” in the embodiment of FIG. 7. This second request 740 may use the same format as used with first request 720, namely one, or a combination of, the embodiments of Tables 3 to 5 and FIGS. 2 to 4. In some cases, the error indication 730 indicates that second device 712 can provide information in Unit B.

In the example of FIG. 7, second device is able to provide the requested information with the second units that were found in request 740, and therefore returns a response 750 providing the information with the requested units.

First device receives response 750. In some cases, first device may use the signal with the second units.

In some cases, because first device 710 knows that the units are not the desired units, first device 710 may optionally convert the units to a desired unit at block 752.

As with the embodiments of FIGS. 5 and 6, the embodiment of FIG. 7 may provide other information where such information is specified in the request. Specifically, rather than, or in addition to, requesting a signal with units, the request could include data types, types of information, or other data that is associated with a particular signal to remove ambiguity. Thus, the present disclosure is not limited to a request for a signal or the return of a signal where the units are specified. For example, Vehicle.Speed or Vehicle.Speed.MPH could become Vehicle.Speed.String or Vehicle.Speed.MPH.String to return the speed in a string format. Other options are possible.

Based on the embodiments of FIGS. 2 to 7 and Tables 3 to 5, ambiguity in communications between two devices is reduced or eliminated.

Example Vehicle System

The present disclosure is described with regard to an automotive system. However, this is merely provided for illustration purposes and the methods and systems described herein could equally be used with any other systems.

Figure 8:
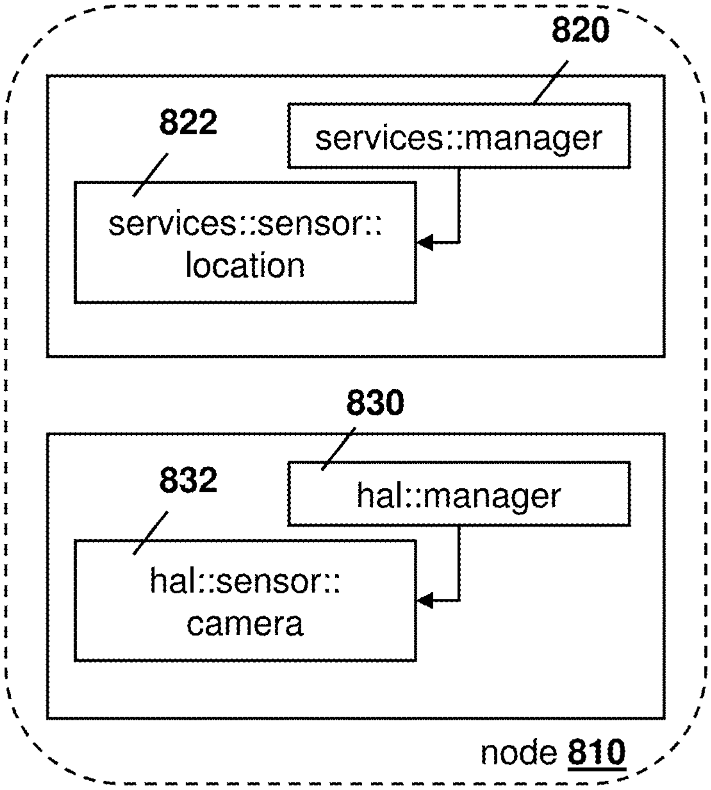
FIG. 8 is a block diagram showing an example vehicle computing node.

For example, reference is now made to FIG. 8 which shows a node 810. A node, as used herein, may be one or a group of electronic control units, central processing units, or kernel controls, among other options, and can be considered as a single computing unit.

In the example of FIG. 8, node 810 includes a services manager 820 that may interact with drivers for sensors that the node is connected to. For example, the node 810 may have access to a location sensor such as a Global Positioning System (GPS) chipset, as shown at block 822.

In order to allow node 810 to interact with modules on other nodes, and to provide functionality with a computing system, a Hardware Abstraction Layer (HAL) may be provided on node 810, which comprises a HAL service 830. Each HAL service 830 is responsible for the integration of a sensor and may provide various functions, including: integration to the underlying sensor; normalization of the sensor data; and/or, if required, providing a barrier between the safety certified and non-certified software. Other functions for the HAL service are also possible.

In the example of FIG. 8, the HAL is provided for camera information, as shown with block 832.

While the example of FIG. 8 shows a node 810 with a single service and a single HAL, this is merely provided for illustration purposes. A node 810 could have a single service without a HAL, a single HAL without a service, a plurality of services with no HAL, a plurality of HALs with no service, and/or a combination of services and HALs.

Node 810 will, in many systems, need to communicate with other nodes, such as other ECUs, CPUs, or computing systems, where such ECUs, CPUs, or computing systems may use a different operating system from that of node 810.

Such system may use a modified VSS system as described above.

Example Computing System

The above network elements, nodes, computing devices and other computing platforms may be implemented using any computing device. One simplified diagram of a computing device is shown with regard to FIG. 9. The computing device of FIG. 9 could be any fixed or mobile computing device.

Figure 9:
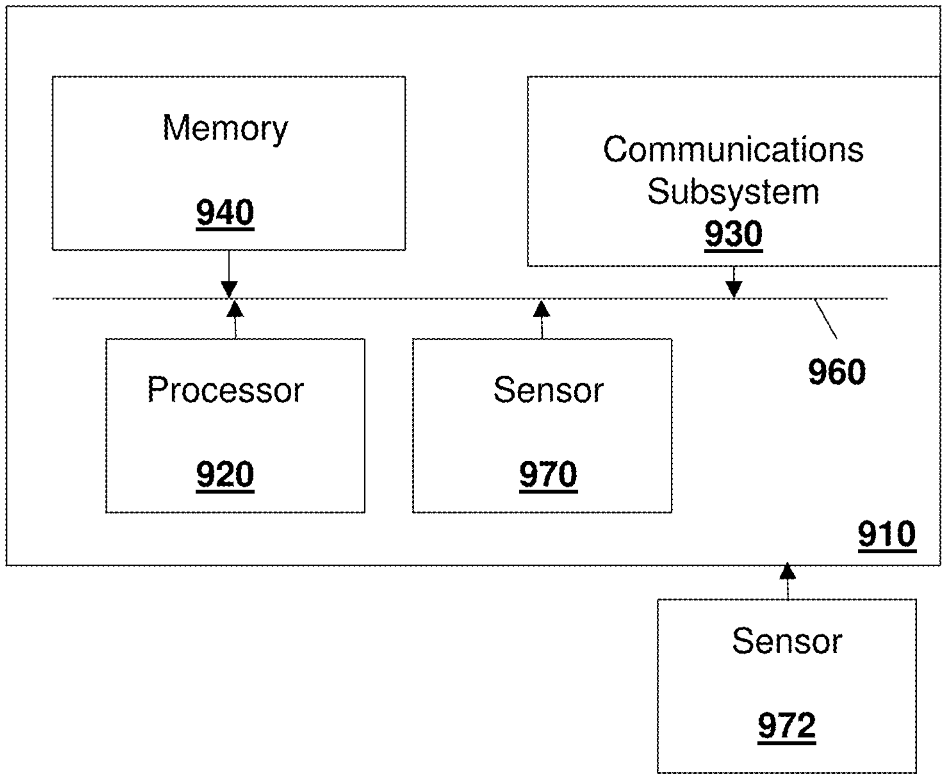
FIG. 9 is a block diagram of a simplified computing device capable of being used with the embodiments of the present disclosure.

In FIG. 9, device 910 includes a processor 920 and a communications subsystem 930, where the processor 920 and communications subsystem 930 cooperate to perform the methods of the embodiments described above. Communications subsystem 930 allows device 910 to communicate with other devices or network elements and may vary based on the type of communication being performed. Further, communications subsystem 930 may comprise a plurality of communications technologies, including any wired or wireless communications technology.

Processor 920 is configured to execute programmable logic, which may be stored, along with data, on device 910, and shown in the example of FIG. 9 as memory 940. Memory 940 can be any tangible, non-transitory computer readable storage medium which stores instruction code that, when executed by processor 920 cause device 910 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 940, device 910 may access data or programmable logic from an external storage medium, for example through communications subsystem 930.

In the example of FIG. 9, one or more internal sensors 970 or external sensors 972 may be associated with the computing device. However, this is optional and in some cases computing device 910 will not be associated with sensors.

Communications between the various elements of device 910 may be through an internal bus 960 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc.

Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device comprising:

sending a request for data from a signal to a second entity, the request identifying the signal by a name path corresponding to a tree structure; and receiving a response providing the data, the response further specifying a measurement unit for the signal, wherein the response comprises the name path of the signal, wherein the name path comprises the measurement unit.

2. The method of claim 1, wherein the response includes using a separator after a signal name, the measurement unit being specified after the separator.

3. The method of claim 2, wherein the measurement unit is defined in an enumerated list of measurement units for the signal.

4. The method of claim 3, wherein, when the request does not specify the measurement unit, the response includes a first measurement unit from the enumerated list.

5. The method of claim 1, wherein the signal is part of the tree structure, wherein the response includes the measurement unit as part of a branch to the signal.

6. The method of claim 5, wherein the response further includes a data type specified as a branch to the signal.

7. The method of claim 1, further comprising:

determining that the response is in different measurement units than specified in the request; and converting the measurement units at the computing device.

8. The method of claim 1, wherein the request includes a first request for data in a first measurement unit, the method further comprising, prior to the receiving:

receiving an error message from the second entity in response to the first request; and sending a second request to the second entity, the second request comprising the request for data using the measurement unit for the signal; and after receiving the response, converting the data in measurement unit to the first measurement unit.

9. The method of claim 1, wherein the signal is a Connected VEhicle Systems Alliance (COVESA) Vehicle Signal Specification (VSS) signal.

10. A computing device comprising:

a processor; and a communication subsystem, wherein the computing device is configured to:

send a request for data from a signal to a second entity, the request identifying the signal by a name path corresponding to a tree structure; and receive a response providing the data, the response further specifying a measurement unit for the signal, wherein the response comprises the name path of the signal, wherein the name path comprises the measurement unit.

11. The computing device of claim 10, wherein the response includes using a separator after a signal name, the measurement unit being specified after the separator.

12. The computing device of claim 11, wherein the measurement unit is defined in an enumerated list of measurement units for the signal.

13. The computing device of claim 12, wherein, when the request does not specify the measurement unit, the response includes a first measurement unit from the enumerated list.

14. The computing device of claim 10, wherein the signal is part of the tree structure, wherein the response includes the measurement unit as part of a branch to the signal.

15. The computing device of claim 14, wherein the response further includes a data type specified as a branch to the signal.

16. The computing device of claim 10, wherein the computing device is further configured to:

determine that the response is in different measurement units than specified in the request; and convert the measurement units at the computing device.

17. The computing device of claim 10, wherein the request includes a first request for data in a first measurement unit, the computing device further being configured to, prior to the receiving:

receive an error message from the second entity in response to the first request; and send a second request to the second entity, the second request comprising the request for data using the measurement unit for the signal; and after receiving the response, convert the data in measurement unit to the first measurement unit.

18. A non-transitory computer readable medium for storing instruction code which, when executed by a processor of a computing device cause the computing device to:

send a request for data from a signal to a second entity, the request identifying the signal by a name path corresponding to a tree structure; and receive a response providing the data, the response further specifying a measurement unit for the signal, wherein the response comprises the name path of the signal, wherein the name path comprises the measurement unit.

* * * * *